(12) United States Patent
Murray et al.

(10) Patent No.: US 6,279,483 B1
(45) Date of Patent: Aug. 28, 2001

(54) RAIL/ROAD TRANSPORT

(75) Inventors: Noel W. Murray, Mount Waverley; John K. Knight, Doncaster; Robert E. Randell, Bayswater; Bruce T. Kuhnell, Glen Iris; Peter Dransfield, Beaumaris, all of (AU)

(73) Assignee: Railroad Technologies Pty. Ltd., Box Hill (AU)

( * ) Notice: Subject to any disclaimer, the term of this patent is extended or adjusted under 35 U.S.C. 154(b) by 0 days.

(21) Appl. No.: 09/297,080

(22) PCT Filed: Oct. 31, 1997

(86) PCT No.: PCT/AU97/00741

§ 371 Date: Jul. 15, 1999

§ 102(e) Date: Jul. 15, 1999

(87) PCT Pub. No.: WO98/19902

PCT Pub. Date: May 14, 1998

(30) Foreign Application Priority Data

Nov. 4, 1996 (AU) .................................................. PO3414
May 23, 1997 (AU) .................................................. PO6987

(51) Int. Cl.⁷ .................................. B61B 1/00; B65F 9/00
(52) U.S. Cl. ........................... 104/29; 105/355; 105/370; 414/333
(58) Field of Search ................................. 104/29, 30, 31; 105/355, 356, 359, 370; 414/333

(56) References Cited

U.S. PATENT DOCUMENTS 4,154,170 * 5/1979 Williams ................................. 104/29
4,456,413   6/1984 Pavlice .
5,226,367 * 7/1993 McLaughlin ........................... 104/29

FOREIGN PATENT DOCUMENTS

9014816 * 2/1991 (DE) ................................. B61D/3/04
41 12 995   11/1992 (DE) .

* cited by examiner

Primary Examiner—S. Joseph Morano
Assistant Examiner—Robert J. McCarry, Jr.
(74) Attorney, Agent, or Firm—Nixon & Vanderhye P.C.

(57) ABSTRACT

A method for transporting road haulage trailers by railway train using carriages having flat load bearing tops (2). The carriages are constructed so that they are on the same level as a railway platform (61) so that trailers (7) may be driven directly onto the carriages from the platform (61) and decoupled from a prime mover in order that the trailers can be arranged end to end along the train (1). Similarly the trailers may be unloaded by bringing in the train into registry with an unloading platform (91) and driving the trailers directly from the train onto the unloading platform with a prime mover. A series of rollers (62) may be provided to underlie the edges of the flat tops (2) in order to prevent them tilting when the trailers are driven onto the train. Also included is a railway carriage suitable for use in carrying out the above method including: (i) a pair of bogies supporting a flat top; (ii) a stanchion for supporting a road haulage trailer provided on the flat top; and (iii) height adjustment means provided on the railway carriage for lowering wheels of the road haulage trailer below the level of the flat top.

28 Claims, 6 Drawing Sheets

RAIL/ROAD TRANSPORT

FIELD OF THE INVENTION

This invention relates to the transport of trailers suitable for road haulage by rail.

BACKGROUND OF THE INVENTION

The concept of using rail transport for transporting loaded trailers which would otherwise be imoved by road transport is not a new one. There are clear advantages in being able to transport trailers over long distances by train. For example, only one driver may be required to transport as much as 100 loads or more of trailers compared with the corresponding situation on the road where 100 or more drivers would be required. As the trailers can be detached from their prime movers during these rail transporting operations, there is also significant reduction in wear and tear on the prime movers and savings in fuel costs as well.

Furthermore, the fact that the. trailers which are often quite heavy are not travelling along long stretches of roads between capital cities means that road damage between those cities can be substantially reduced. In addition accidents involving heavy vehicles should be reduced.

Because of the obvious advantages of combined road/rail transporting systems, various approaches to achieving such transport have been proposed. For example, in one approach, trailers are driven onto a "basketp" and detached from their prime mover. The baskets are then lifted by crane onto a railway flat car and secured thereto. At the receiving depot, the baskets are again removed by cranes and the trailers are driven off the baskets by a prime mover provided at the depot. Whilst this type of approach is workable, it suffers from the disadvantages that there is a considerable amount of handling involved in locating the trailers in the baskets and moving them by crane onto the individual flat cars of the train. Furthermore, this same amount of handling is duplicated at the receiving depot. In addition, the capital and labour costs associated with this approach all add to the overall cost of transport which can be quite high as a result.

In another approach, railway wagons are aligned over a revolvable vertically movable platform which moves to align wagons with the height of the platform to allow trailers to be driven directly thereon. Again, whilst such an approach does work, it has the limitation that each wagon must be individually located above the moveable rotating platform after being disconnected from the train prior to loading or unloading and must then be rejoined with the train on a wagon by wagon basis. This represents a major limitation which slows the loading and unloading process requiring considerable labour and results in a high overall transport cost.

In yet another approach, individual bogies are constructed so that they are able to support the ends of trailers and hold them above a railway line. Thus the trailers themselves interconnect successive bogies to form a train. The obvious disadvantages with this approach arc that the strength of the train is limited to the strength of the individual trailers. As road transport trailers are generally not as robustly constructed as railway wagons, there is a severe limitation on the length of any train-which can be put together in this fashion as the length of a train is dependent on the weakest link in a train i.e. the weakest trailer. In addition, there are difficulties in connecting up the trailers in this fashion because of the degree of handling involved.

Generally speaking, most approaches are limited in terms of the height of the load a train can carry because of the height restrictions imposed by existing bridges and tunnels under which and through which the train must travel and the limitations a high load center of gravity may present in travelling around bends at speed.

Because of the disadvantages of the various approaches which have been taken to transport road haulage trailers, there is a need for an integrated approach to the problem which involves being able to haul large numbers of trailers on the one train, requires relatively easy handling at both the loading and unloading stages, and is capable of accepting trailers of variable height and centre of gravity.

DISCLOSURE OF THE INVENTION

In one aspect the invention provides a method for transferring road trailers to a train having a plurality of elongate load bearing tops, including the steps of bringing said tops into close parallel registry with a loading platform, the region of the loading platform adjacent to the tops being arranged at substantially the same height as the tops, and driving trailers directly from the loading platform onto the tops.

Suitably the road trailers will be driven onto the tops by a prime mover. Each trailer may be backed onto a top, and the prime mover decoupled to drive away and bring a further trailer, the operation being repeated until sufficient trailers are located end to end along the tops.

The trailers may be supported at one end by support means such as one or more stanchions. They may be clamped to the tops or to rail wagons or bogies supporting the tops. The wheels of the trailer may be lowered below the level of the tops to reduce the overall height and to lower the centre of gravity. Any supporting stanchions may be lowered as well.

The tops may be supported by railway wagons or bogies. The construction of the train may be such that trailers may be driven along the length of the train. Thus, intermediate plates may be provided between adjacent tops to facilitate driving trailers along and between tops.

Suitably the edges of the tops adjoining the platform are supported against tilting, when the trailers are driven thereonto.

The trailers may be reinoved from the train (n to a receiving platform arranged in a fashion similar to the loading platform. During unloading the trailer wheels may be raised to the level of the tops. Subsequently a prime mover may be used to remove them from the train one by one by driving them directly onto the receiving platform.

A receiving platform and a loading platform on opposite sides of the train may suitably be arranged at each train stop to facilitate rapid loading and unloading. Thus trailers on the train may be rapidly driven directly off the train to be parked at unloading bays provided in association with the receiving platform. Subsequently, trailers parked at loading bays associated with the loading platform on the opposite side of the train may be moved directly and rapidly onto the train.

Alternatively the train may be loaded and unloaded from a single platform on the side of the train.

In a second aspect the invention provides a trailer loading facility for trains including a train having a plurality of load bearing tops, and a loading platform with an edge region running closely adjacent to, parallel to and at substantially the same height as said load bearing tops. The arrangement and construction being such that trailers may be driven directly onto said tops from said loading platform.

Suitably the tops are mounted upon railway wagons or bogies.

A plate may be provided between each adjacent top to allow trailers to be driven thereover. The plate may be mounted between adjacent railway wagons to form a bridge there between. Alternatively, the plate may be mounted on bogies located between and supporting adjacent tops. It may form part of a pivot region between adjacent tops. It may take the form of a part circular turntable. The plate may lie flush with the level of the tops. Alternatively, it may be at a higher level. For example, it may overlie adjacent tops.

Height adjustment means may be provided with one or more tops. The height adjustment means may include one or more movable support segments. Suitably there are at least two movable support segments. The movable support segments may be arranged to support the wheels of a trailer. They.may be arranged to sit flush with the level of the top in an elevated position. They may be movable to a lowered position to lower the height of trailers and hence the centre of gravity of the trailers supported on the train. These support segments may be lowered into wells provided beneath the tops. They may include hydraulic cylinders for raising and lowering. Suitably the segments are provided in pairs. There may be one, two or more pairs of segments per top. Multiple pairs of segments may suitably be used where the length of the trailers is short and it is desired to load more than one trailer per top.

Support means for supporting a portion of the trailers may be provided with each top. The support means may be adjustable to allow for trailers of different length. More than one support means may be provided in association with each top. The support means may include a stanchion. The support means may act to rigidly clamp or secure a trailer.

Anti-tilt means may be- provided in association with each receiving and unloading platform andlor with each top. Where the anti-tilt means are associated with the receiving and unloading platforms, they may be provided between the edge of the platform and the train. The anti-tilt means may take the form of rollers which are able to bear against the underside of the tops.

They may be arranged to bear against the underside only when the train has been loaded and the weight of the load has caused the tops to sink to the level of the rollers such that they are able to bear upon the rollers. Alternatively the rollers may be set at such a height that they bear against the underside of the tops even when the train is unloaded. In another alternative, the anti-tilt means may include a series of moveable bearing members which move to engage and support the underside of the tops when actuated. Suitably the bearing members may include hydraulically operated rams.

The anti-tilt means may also be provided on the train. Thus, for example they may comprise rollers arranged to bear upon a continuous ledge support or rail provided between the train or the platform. Alternatively, the moveable bearing members described above may be mounted on the underside of the train and may be actuated to support the underside of the edges of the tops to prevent tilting.

Clamping means may also be provided on the train. They may be arranged to clamp a portion of a trailer. Suitably the clamping means may be provided in one or more wells on the tops.

BRIEF DESCRIPTION OF THE DRAWINGS

The invention will now be described with reference to the accompanying drawings which demonstrate preferred embodiments of the invention.

DETAILED DESCRIPTION OF THE PREFERRED EMBODIMENTS

Referring to FIGS. 1 to 5, where like numerals designate like components, there is shown a train 1 having a number of flat tops 2 mounted on bogies 3 which in turn run along the rails 4.

The flat tops are reinforced in a conventional manner such as by the box section reinforcement 5.

Trailers 7, 8, 9 and 10 are mounted on the train. It is noted that the wheels of trailers 7, 8 and 9 have been lowered beneath the level of the flat tops 2 into wells provided beneath the flat tops.

Stanchions 11 are provided at appropriate locations on the train to hold the trailers upright and to hold or clamp them. Alternative locations for the stanchions are also provided in the form of support sockets 12 on the flat tops to support the trailers.

The stanchions 11 and support sockets 12 may be of adjustable height and may be arranged to sit in wells provided beneath the level of the flat tops. The flat tops are provided with pairs of segments 15 and 16. The segments may be arranged in places corresponding to the wheels of the. trailer and may be lowerable into wells located beneath the flat tops 2.

Plates 17 in the form of part circular turntables are provided between adjoining flat tops 2 in order to give a continuous substantially flat surface along the length of the train over which the trailers may be driven during loading and unloading. Whilst the plates 17 are shown as being flush with the level of the flat tops 2 in the illustrated embodiment it is to be understood that they may also overlap the flat tops in which case they do not need to be circular. Each plate 17 may be mounted on a mount 18 which is in turn mounted on the low profile bogies 3.

Figure 1:
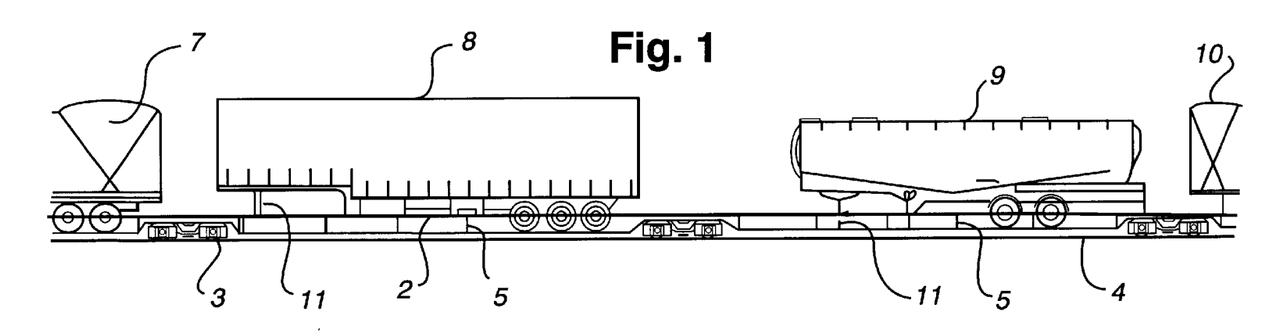
FIG. 1 is an elevational view of a train loaded with trailers in accordance with the invention.
Figure 2:
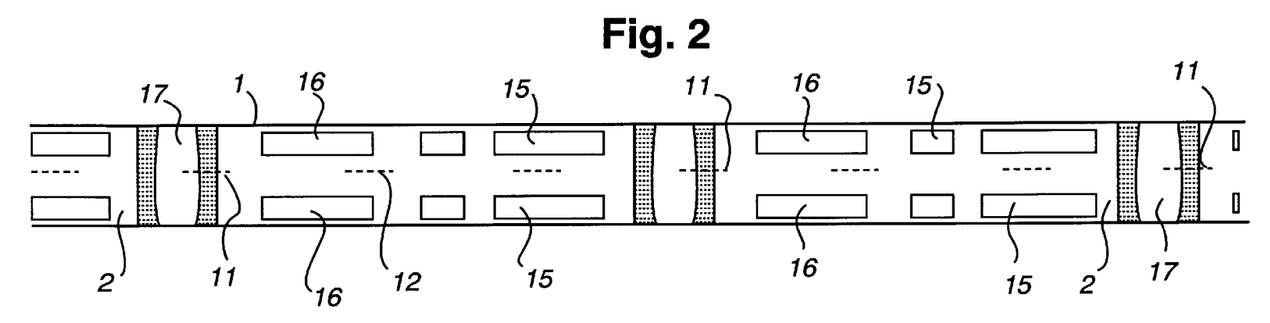
FIG. 2 is a plan view of the train deck shown in FIG. 1.
Figure 3:
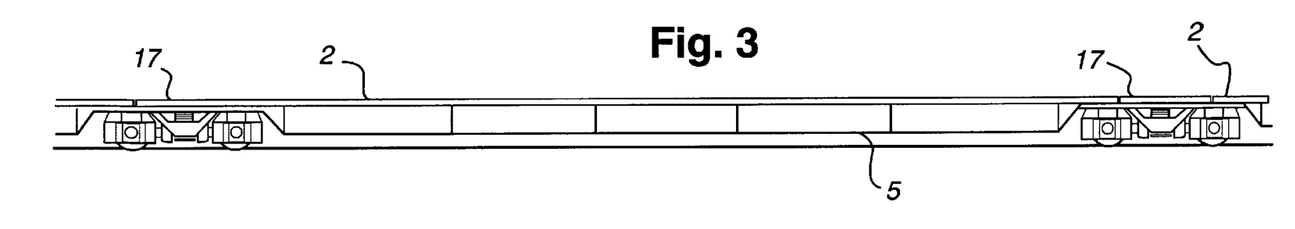
FIG. 3 shows an enlarged elevational view of the train showing FIGS. 1 and 2 without trailers thereon.
Figure 4:
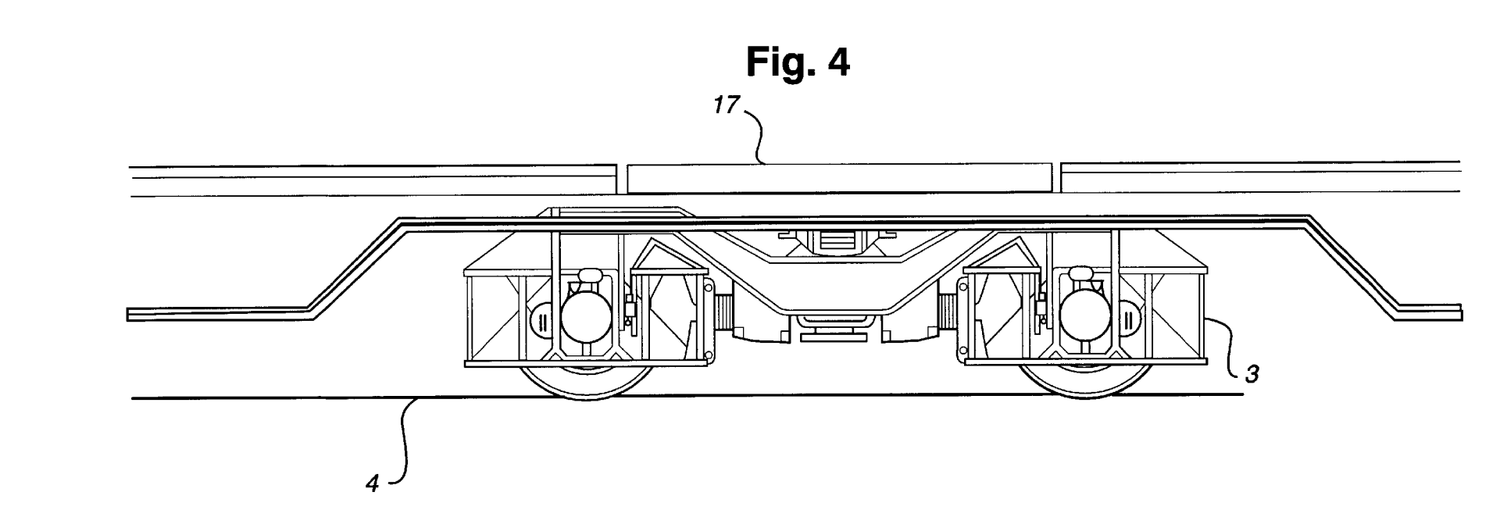
FIG. 4 shows an elevational and expanded view of the shared bogies shown in FIGS. 1 to 3.
Figure 5:
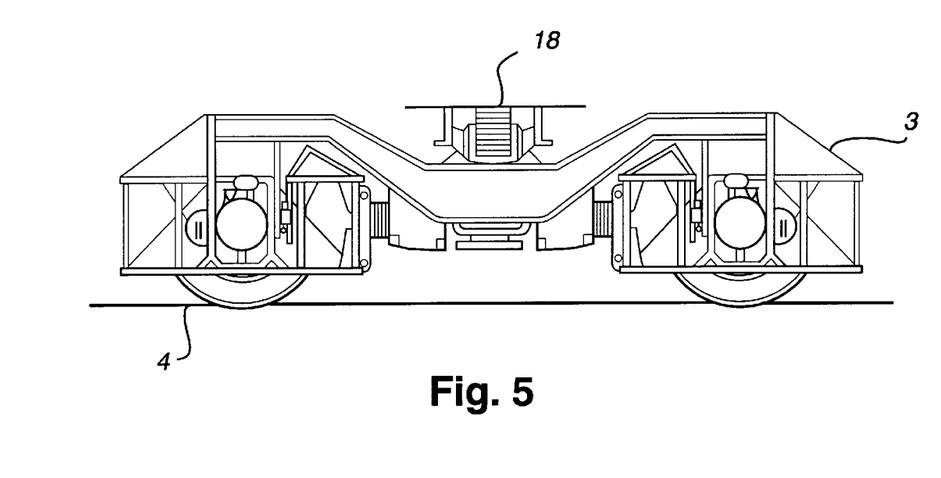
FIG. 5 shows an elevational view of a low profile bogie set with top removed.
Figure 6:
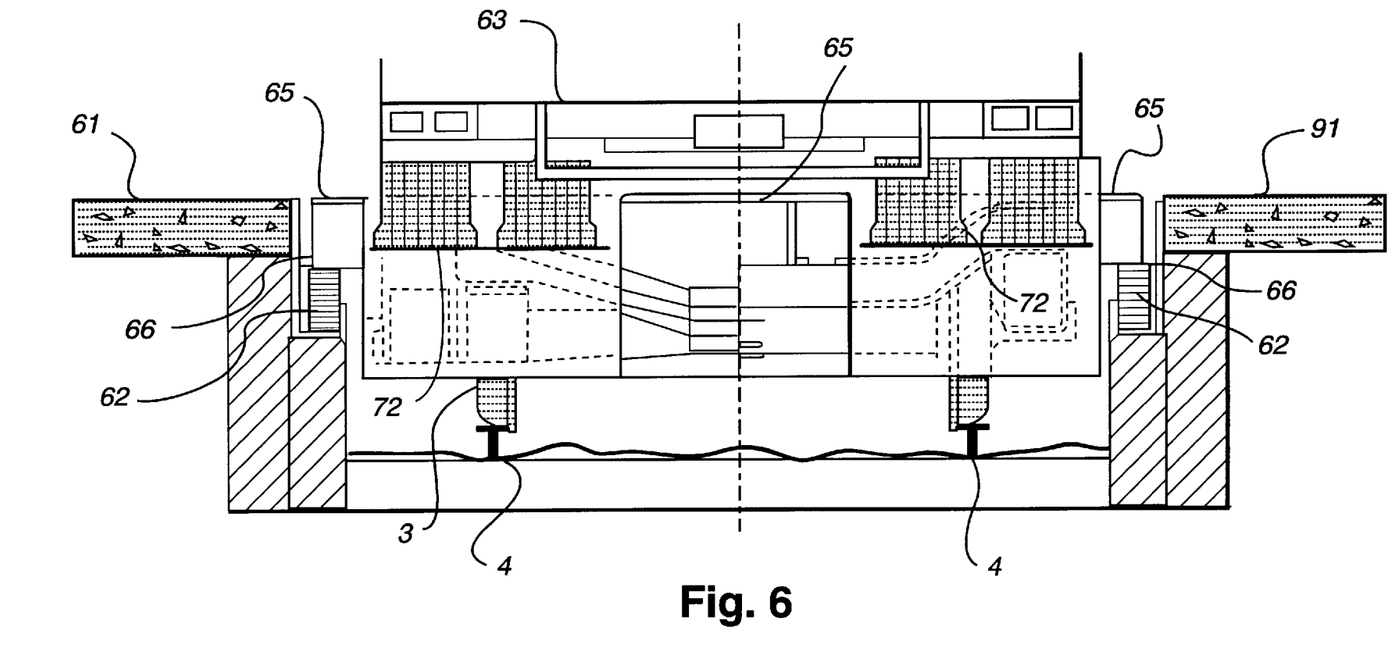
FIG. 6 shows a cross sectional view of a trailer mounted on a train next to a loading platform.
Figure 7:
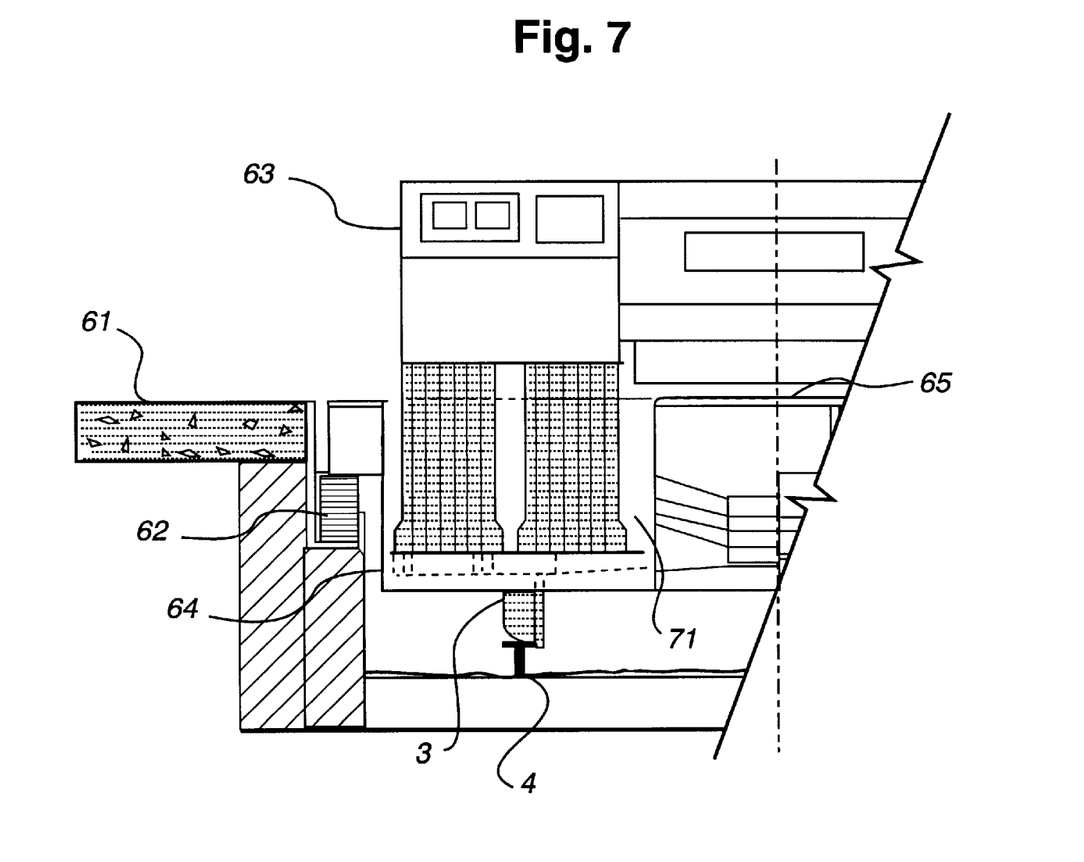
FIG. 7 shows a segmentary view of the arrangement in FIG. 6 with the trailer fully lowered.
Figure 8:
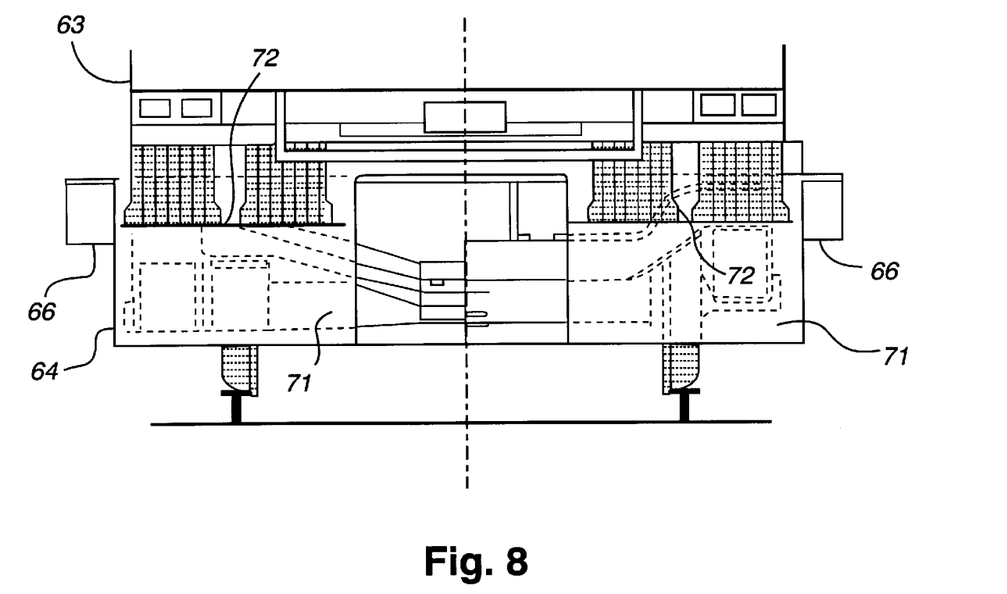
FIG. 8 shows a section of a trailer loaded on a wagon with the trailer partially lowered.

Referring to FIGS. 6 to 8, it can be seen that the loading platform 61 is at substantially the same level as the flat top 65 in order that the trailers 63 can be driven directly onto the train 64 from the platform as if the train formed a horizontal extension of the platform. A receiving or unloading platform 91 is provided on the opposite side to allow unloading in the same fashion, i.e. by driving trailers directly off the flat tops onto the receiving platform.

Rollers 62 are provided beneath the flat top edges 66 in order to support the flat top edges should the flat tops tilt when the trailers are driven thereonto. The illustrated embodiment shows a gap between the rollers and the edge of the flat top. It is to be understood that in actual use a slight gap may be acceptable to prevent any undue tilting of the flat top when the trailer is driven thereonto. However, when the trailer is actually located on the flat top it is anticipated that the rollers will actually bear against and support the flat top edges 66.

As shown in the drawings, the segments 72 forming part of the surface of the flat top may be lowered to a desired height in the wells 71. In this way, the trailer 63 may be lowered so that it is able to pass under low lying bridges and through smaller tunnels and the center of gravity of the trailer is lowered relative to the ground as well to improve stability. Furthermore, the sides of the wells 71 serve to secure the wheels of the trailer against sideway movement and thus promote the overall stability of the loaded train.

Figure 9:
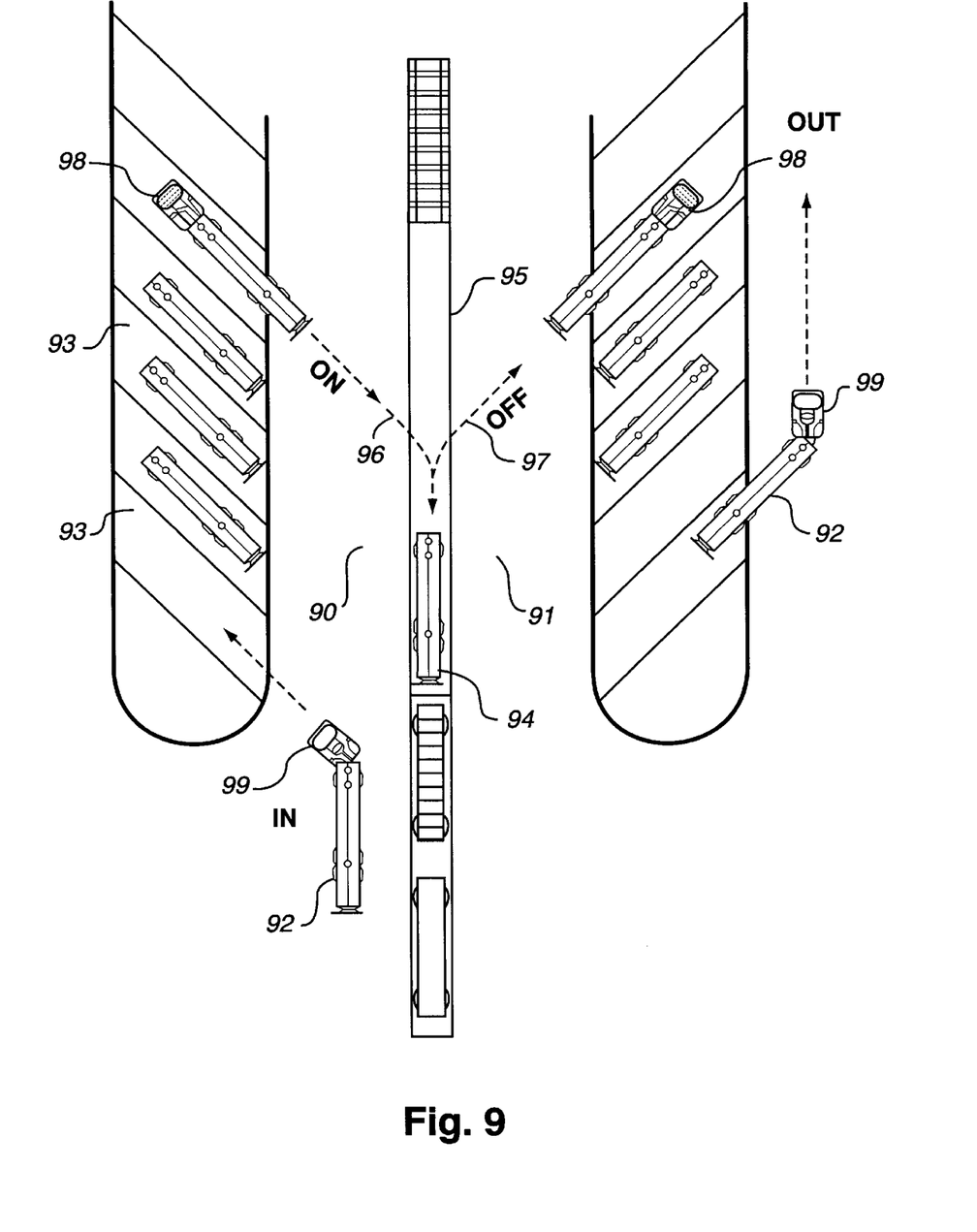
FIG. 9 shows a diagrammatic plan of a train loading and unloading facility.

Referring to FIG. 9, there is shown a loading platform 90 and unloading platform 91 both platforms being provided with parking bays 93.

Prime movers 99 deliver and receive trailers 92 to and from the parking bays93.

Trailers 92 may be backed onto the train 94 by means of a tractor 98 in the direction of arrow 96 from the loading platform 90. When a trailer has been backed onto the train, the tractor 98 is unhitched and is returned to pick up a further trailer which is then backed up against the first trailer, the whole process being repeated until the train consisting of the flat top wagons 95 is filled.

The reverse operation is carried out in the unloading direction 97 when a full train pulls into the platform to have its load removed.

Thus it can be seen that a train can be rapidly unloaded by hitching up a tractor to the respective online trailers one at a time, and driving them directly off the train into the parking bays on the unloading platform 91. Subsequently, the same tractor may be used to back a new load of trailers held in the parking bays on the loading platform 90 by reversing them onto the flat top carriages 95 in the direction of the arrow 96.

Whilst it has been convenient to describe the invention herein in relation to particularly preferred embodiments, it is to be appreciated that other constructions and arrangements are considered as failing within the scope of the invention. Various modifications, alterations, variations and/or additions to the constructions and arrangements described herein are also considered as falling within the scope and ambit of the present invention.

What is claimed is:

1. A method for transferring road haulage trailers to a railway train having a plurality of elongate load bearing tops, including the steps of bringing said tops into close parallel registry with a loading platform, the region of the loading platform adjacent to the tops being arranged at substantially the same height as the tops, driving the road haulage trailers directly from the loading platform onto the tops and lowering the road haulage trailers with respect to the tops after being driven thereonto.

2. A method according to claim 1 wherein the road haulage trailers are each driven on to the tops by a prime mover which is then decoupled from each road haulage trailer and driven away to bring a further road haulage trailer, the driving and decoupling step being repeated until a desired number of road haulage trailers are located end to end along the tops.

3. A method according to claim 1 wherein the road haulage trailers are each supported at one end by one or more stanchions and are fastened to the tops, or to rail wagons or bogies supporting the tops.

4. A method according to claim 1 wherein wheels of the road haulage trailers loaded on the tops and any supporting stanchions are lowered below the level of the tops, and the tops are mounted on railway wagons or bogies.

5. A method according to claim 1 wherein intermediate plates are provided between adjacent tops to facilitate driving road haulage trailers along and between tops.

6. A method according to claim 1 wherein the edges of tops adjacent the platform are supported against tilting when the road haulage trailers are driven thereonto.

7. A method according to claim 1 wherein road haulage trailers are driven from the tops directly onto a receiving platform arranged in close parallel registry with the tops.

8. A method according to claim 7 wherein the receiving platform is on the opposite side of the railway train with respect to the loading platform.

9. A method for transferring road haulage trailers to a railway train having a plurality of load bearing tops including the steps of:

(i) bringing the tops into close parallel registry with a loading platform, the region of the loading platform adjacent to the tops being arranged at substantially the same height as the tops, (ii) driving a road haulage trailer directly from the loading platform onto the tops using a prime mover;

(iii) supporting the edges of the tops against tilting when the road haulage trailer is driven thereonto;

(iv) decoupling the prime mover from the road haulage trailer;

(v) and lowering the road haulage trailers with respect to the tops after being driven thereonto;

(vi) repeating steps (ii), (iii), (iv) and (v) to provide a desired number of road haulage trailers located end to end along the tops.

10. A method according to claim 9, wherein the lowered road haulage trailers are each supported at one end by one or more stanchions.

11. A transport system for road haulage trailers including:

(i) a loading platform;

(ii) a railway train having a plurality of flat tops;

(iii) a height adjuster provided for lowering wheels of a road haulage trailer below the level of the flat top, (iv) train rails arranged to bring the flat tops into close parallel registry with the loading platform such that the region of the loading platform adjacent to the tops is arranged at substantially the same height as the tops to facilitate the driving of load haulage trailers directly from the loading platform onto the tops; and (v) bridging elements bridging adjacent tops, the bridging elements acting to facilitate the driving of road haulage trailers along and between the tops.

12. A transport system according to claim 12 including primary support elements adapted to support the tops against tilting when the road haulage trailers are driven onto the tops.

13. A transport system according to claim 12 wherein the support elements include a plurality of rollers arranged between the loading platform and the railway train to underlie the tops and provide support to the tops against tilting.

14. A transport system according to claim 11 including a receiving platform at substantially the same height as the tops in close parallel registration with the tops opposite the loading platform.

15. A transport system according to claim 14 including secondary support elements adapted to support the tops on the side of the receiving platform.

16. A transport system according to claim 15 wherein the secondary support elements include a plurality of rollers arranged between the loading platform and the railway train to underlie the tops and provide support to the tops against tilting.

17. A transport system according to claim 11 wherein each top is provided with at least one stanchion for supporting the end of a road haulage trailer.

18. A transport system according to claim 11 wherein the bridging elements include a plate or plates extending to bridge a gap formed between the ends of adjacent flat tops.

19. A transport system for road haulage trailers including:
   (i) a loading platform;
   (ii) a railway train having a plurality of carriages provided with flat tops and height adjuster for lowering wheels of the roadhaulage trailer below the level of the flat top;
   (iii) train rails arranged to bring the flat tops into close parallel registry with the loading platform such that the region of the loading platform adjacent to the tops is arranged at substantially the same height as the tops to facilitate the driving of load haulage trailers directly from the loading platform onto the tops; and
   (iv) primary support elements adapted to support the tops against tilting when the road haulage trailers are driven onto the tops.

20. A transport system according to claim 19 including bridging elements bridging a gap formed between adjacent tops to facilitate the driving of road haulage trailers along and between tops.

21. A Transport system according to claim 19 including a receiving platform and secondary support elements wherein the train rails are arranged to bring the flat tops into close parallel registry with the receiving platform such that the region of the receiving platform adjacent to the tops is arranged at substantially the same height as the tops to facilitate the driving of road haulage trailers directly from the tops onto the receiving platform, and the secondary support elements are arranged to support the tops against tilting when the road haulage trailers are driven from the tops onto the receiving platform.

22. A transport system according to claim 21 wherein a receiving platform is provided on the opposite side of the train to the loading platform.

23. A railway carriage suitable for use in carrying out the method of claim 1 including:
   (i) a pair of bogies supporting a flat top;
   (ii) a stanchion for supporting a road haulage trailer provided on the flat top; and
   (iii) a height adjuster provided on the railway carriage for lowering wheels of the road haulage trailer below the level of the flat top.

24. A railway carriage according to claim 23 wherein the height adjuster includes one or more support segments arranged to support the wheels of a road-haulage trailer, the one or more support segments movable from a position where they are substantially level with the top to a lower position beneath the tops.

25. A railway carriage according to claim 24 wherein there are at least two movable support segments which may be lowered into one or more wells provided on the railway carriage by hydraulic cylinders.

26. A railway train including a plurality of railway carriages constructed according to claim 24, having bridging elements extending to bridge a gap formed between each pair of adjacent tops of railway carriages.

27. A railway train according to claim 26 wherein the bridging elements include a plate overlying adjacent tops or a plate mounted on bogies supporting adjacent tops.

28. A railway train suitable for use in carrying out the method of claim 1 including:
   (i) a plurality of bogies;
   (ii) a plurality of elongate tops forming a train mounted on the bogies, each bogie supporting two adjacent flat tops;
   (iii) bridging elements supported by the bogies extending to bridge a gap formed between adjacent flat tops to facilitate the driving of road haulage trailers along and between tops
   (iv) a height adjuster for lowering wheels of a road haulage trailer below the level of the flat top.

* * * * *